US012091302B2

(12) United States Patent
Iotti

(10) Patent No.: US 12,091,302 B2
(45) Date of Patent: Sep. 17, 2024

(54) TELEHANDLER WITH FACILITATED ALIGNMENT ADJUSTMENT

(71) Applicant: MANITOU ITALIA S.R.L., Modena (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 336 days.

(21) Appl. No.: 17/644,399

(22) Filed: Dec. 15, 2021

(65) Prior Publication Data

US 2022/0204328 A1 Jun. 30, 2022

(30) Foreign Application Priority Data

Dec. 30, 2020 (IT) ........................ 102020000032828

(51) Int. Cl.
*B66F 9/00* (2006.01)
*B66F 9/065* (2006.01)
*B66F 9/075* (2006.01)

(52) U.S. Cl.
CPC ........ *B66F 9/07559* (2013.01); *B66F 9/0655* (2013.01)

(58) Field of Classification Search
CPC ....... B66F 9/07559; B66F 9/0655; B66F 9/24
USPC ........................................................ 280/763.1
See application file for complete search history.

(56) References Cited

U.S. PATENT DOCUMENTS

| | | | | | |
|---|---|---|---|---|---|
| 4,785,503 | A * | 11/1988 | Gomez | A22C 29/024 | 452/5 |
| 6,179,304 | B1 * | 1/2001 | Ishikawa | B60G 17/005 | 180/290 |
| 6,272,413 | B1 * | 8/2001 | Takahashi | B66F 11/046 | 182/120 |
| 6,988,363 | B2 * | 1/2006 | Bitter | E02F 9/2207 | 60/468 |
| 9,004,844 | B2 * | 4/2015 | Nishiwaki | B66F 9/20 | 414/633 |
| 9,073,739 | B2 * | 7/2015 | Woods | B66F 17/003 | |
| 9,163,387 | B2 * | 10/2015 | Yuan | F15B 19/002 | |
| 9,248,731 | B2 * | 2/2016 | Soma' | B60W 10/26 | |
| 10,752,479 | B2 | 8/2020 | Iotti | | |

(Continued)

FOREIGN PATENT DOCUMENTS

EP 3424869 3/2020

*Primary Examiner* — Hau V Phan
(74) *Attorney, Agent, or Firm* — Pearne & Gordon LLP; J. Gregory Chrisman

(57) ABSTRACT

A telehandler (1) includes a plurality of operating apparatuses (12, 14, 17, 13, 180, 122), including a telescopic operating arm, stabilizers or the like, each operated by one or more actuator devices (19) and electronic processing means (2) which include an acquisition module (21) configured to receive one or more alignment parameters which represent, for the operating apparatuses (12, 14, 17, 13, 180, 122), respective target operating conditions. The telehandler (1) includes detection means (4) for detecting current operating conditions of the operating apparatuses (12, 14, 17, 13, 180, 122) and transmitting corresponding detection signals to the processing means (2), the latter also including a verification module (22) configured to determine, as a function of the detection signals, whether the operating apparatuses (12, 14, 17, 13, 180, 122) are in the respective target operating conditions.

13 Claims, 4 Drawing Sheets

(56) References Cited

U.S. PATENT DOCUMENTS

| | | | | |
|---|---|---|---|---|
| 2004/0210342 | A1* | 10/2004 | Magni | B66F 9/24<br>700/245 |
| 2012/0279938 | A1 | 11/2012 | Benton et al. | |
| 2017/0291802 | A1 | 10/2017 | Hao et al. | |
| 2018/0162704 | A1 | 6/2018 | Hao et al. | |
| 2019/0010036 | A1 | 1/2019 | Iotti | |
| 2019/0039868 | A1* | 2/2019 | Puszkiewicz | B66F 9/0755 |
| 2019/0352157 | A1 | 11/2019 | Hao et al. | |
| 2020/0140249 | A1 | 5/2020 | Hackenberg et al. | |
| 2020/0172384 | A1* | 6/2020 | Cadou | B66F 9/0655 |
| 2020/0207600 | A1* | 7/2020 | Bonnefoy | B66F 11/042 |
| 2020/0263390 | A1* | 8/2020 | Raj | E02F 3/437 |
| 2021/0070595 | A1 | 3/2021 | Hackenberg et al. | |
| 2021/0155463 | A1 | 5/2021 | Hao et al. | |

* cited by examiner

TELEHANDLER WITH FACILITATED ALIGNMENT ADJUSTMENT

TECHNICAL FIELD

This invention relates to a telehandler with facilitated adjustment of the alignment.

More in detail, the invention relates to a telehandler with guided or automatic adjustment of the alignment.

BACKGROUND ART

It is known that telehandlers can be homologated for road travel and that many countries provide specific regulations which regulate the conditions according to which road travel is allowed.

These regulations require that the operator prepares the telehandler with a specific alignment before introducing it into road travel, to avoid the risk of accidents, damage to buildings or putting at risk the safety of drivers, cyclists and pedestrians.

For example, the telehandlers are not allowed to travel on roads having the operating arm raised and extended or having the stabilizers partially lowered or extended or, in the case of use of a rotary telehandler, with the tower not aligned with the axis of the carriage; moreover, there may be further regulations which vary from country to country, such as that of keeping the flashing lights and/or the headlights switched on during the driving, etc.

Not only, but inside the same country, the rules for road circulation of a telehandler also vary on the basis of other factors, such as the type of accessory being carried by the arm; in effect, for example, the height at which a loading cage must be positioned relative to the ground may be different from that at which the forks must be located and, therefore, the relative position of the arm must be different in both cases, and so on. Currently, it is not uncommon that on roads in countries which also specify special regulations, telehandlers circulate whose alignment is not the one suitable for travel or which is only partly suitable, for various reasons, including the fact that the operator is not aware of all the rules imposed by the country in which the operator must circulate with the telehandler, that the operator makes approximation or distraction errors and is, therefore, erroneously convinced of having correctly positioned the arm, tower, stabilizers or other devices or even that the operator is aware of the approximation with which the road alignment has been prepared but has not followed the regulations precisely, due to the fact that this would require the inconvenient and laborious use of tape measures or other measuring instruments to determine, by trial and error, the correct position of the accessory relative to the ground and would also require a time-consuming task.

DISCLOSURE OF THE INVENTION

The technical purpose which forms the basis of the invention is to provide a telehandler with facilitated adjustment of the alignment which overcomes the limitations of the prior art.

The technical purpose specified is achieved by the telehandler made according to the appended claims.

BRIEF DESCRIPTION OF DRAWINGS

Further features and advantages of the present invention are more apparent in the non-limiting description of a preferred embodiment of the proposed telehandler, as illustrated in the accompanying drawings, in which.

DETAILED DESCRIPTION OF PREFERRED EMBODIMENTS OF THE INVENTION

With reference to the accompanying drawings, the numeral 1 denotes in its entirety a telehandler made according to the invention.

Figure 1:
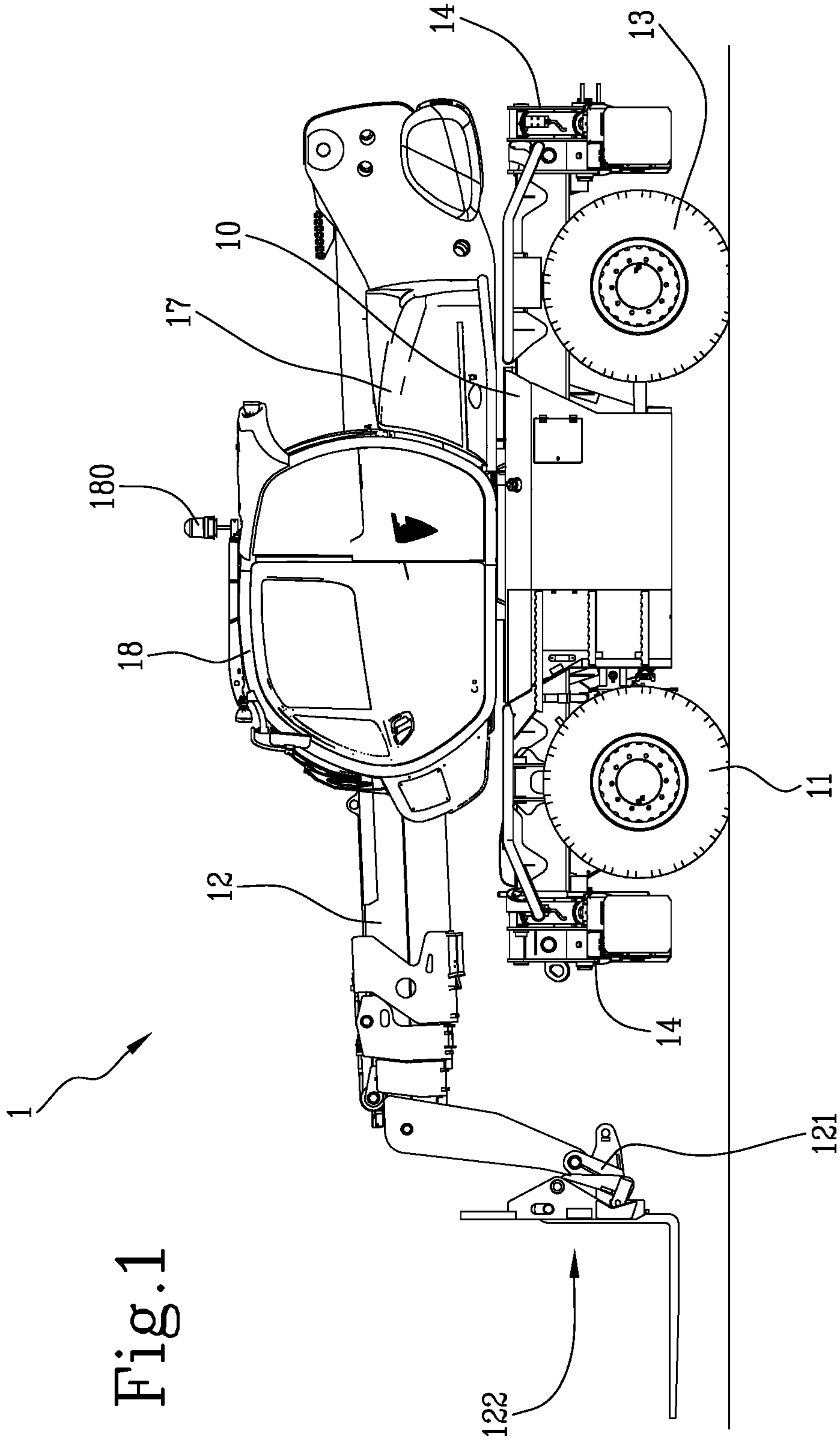
FIG. 1 is a side view of a telehandler according to the invention.

As shown in FIG. 1, the telehandler 1 is equipped with a carriage 10 movable on wheels 11, 13 of a telescopic operating arm 12, designed to lift and move loads and may be equipped with stabilizers 14 comprising a plurality of stabilizing arms.

Thanks to specifically provided hydraulic cylinders, the operating arm 12 can be extended and inclined about a hinge with a horizontal axis and is equipped, at its distal end, with a quick coupling device 121 which allows the removable coupling of equipment 122 which picks up and carries the load, such as forks, cages, winches, etc.

The telehandler 1 may be fixed, in which case the arm 12 and the cab are mounted directly on the carriage 10, or rotary (such as that shown in the drawings), in which case a rotatable platform or "tower" 17, mounted on the carriage 10, has an arm 12 and a cab 18.

In still more detail, the arm 12 may oscillate vertically, under the actuation of a hydraulic cylinder or similar actuator, between a lower position, substantially horizontal, and an upper position wherein the arm 12 is close to the vertical. Moreover, the arm 12 comprises a plurality of segments inserted one inside the other, coaxial with each other and designed to translate along the axial direction; the elongation and retraction of the arm 12 are also produced by one or more hydraulic cylinders, or other actuators. The rotation of the tower 17 is also produced by an actuator preferably hydraulic, such as, for example, a motor-driven rack or "turntable", and it is preferably a hydraulic actuator which allows the tilting or the other movements of the accessory 122.

The above-mentioned stabilizers 14 can include four mobile stabilizing arms, two fronts at the front of the carriage 10 and two at the rear of the carriage 10 which may be of the telescopic type and shaped in the form of scissors, as shown in the accompanying drawings. More in detail, in the case of scissor stabilizers 14, each stabilizing arm includes a hydraulic cylinder for the extension, that is, for moving the extension beams relative to the segments in which they are inserted telescopically and a cylinder for rotation of the arms, which allows the stabilizers 14 to be moved from the raised position to the position in contact with the ground.

The telehandler 1 also mounts an electro-hydraulic distributor 15 to which are individually subject the above-mentioned actuators according to known methods.

The telehandler 1 includes electronic processing means which comprise a processing unit 2 and are therefore a generalisation.

The processing unit 2 may be associated with, including or consisting of the control unit which is normally on board this type of machine.

The processing unit 2 is designed for transmitting control signals to the distributor 15 which consequently controls the actuators, in such a way that they actuate the arm 12, the stabilizers 14, the tower 17 (if present) and the accessory 122 according to the commands issued by the operator who sits in the cab.

In practice, the telehandler 1 includes in the relative cab 18, available to the operator, commands such as joystick 16, pedals, pushbuttons, etc. . . . ; by acting on the commands, the processing unit 2 generates control signals, which are received by the distributor 15, which then adjusts consequently the operation of each actuator of the arm 12, of the stabilizers 14, of the accessory 122 and of the platform 17.

In detail, the processing unit 2 is a control module 20 configured for producing control signals designed to adjust the operation of the actuators of the telehandler 1, on the basis of the actuation of the commands 16 by the operator.

In addition, the invention may, if necessary, comprise the use of a remote control which comprises commands which correspond functionally to those present in the cab 18 and designed to transmit control signals to a receiver which is connected to the processing unit.

Figure 10:
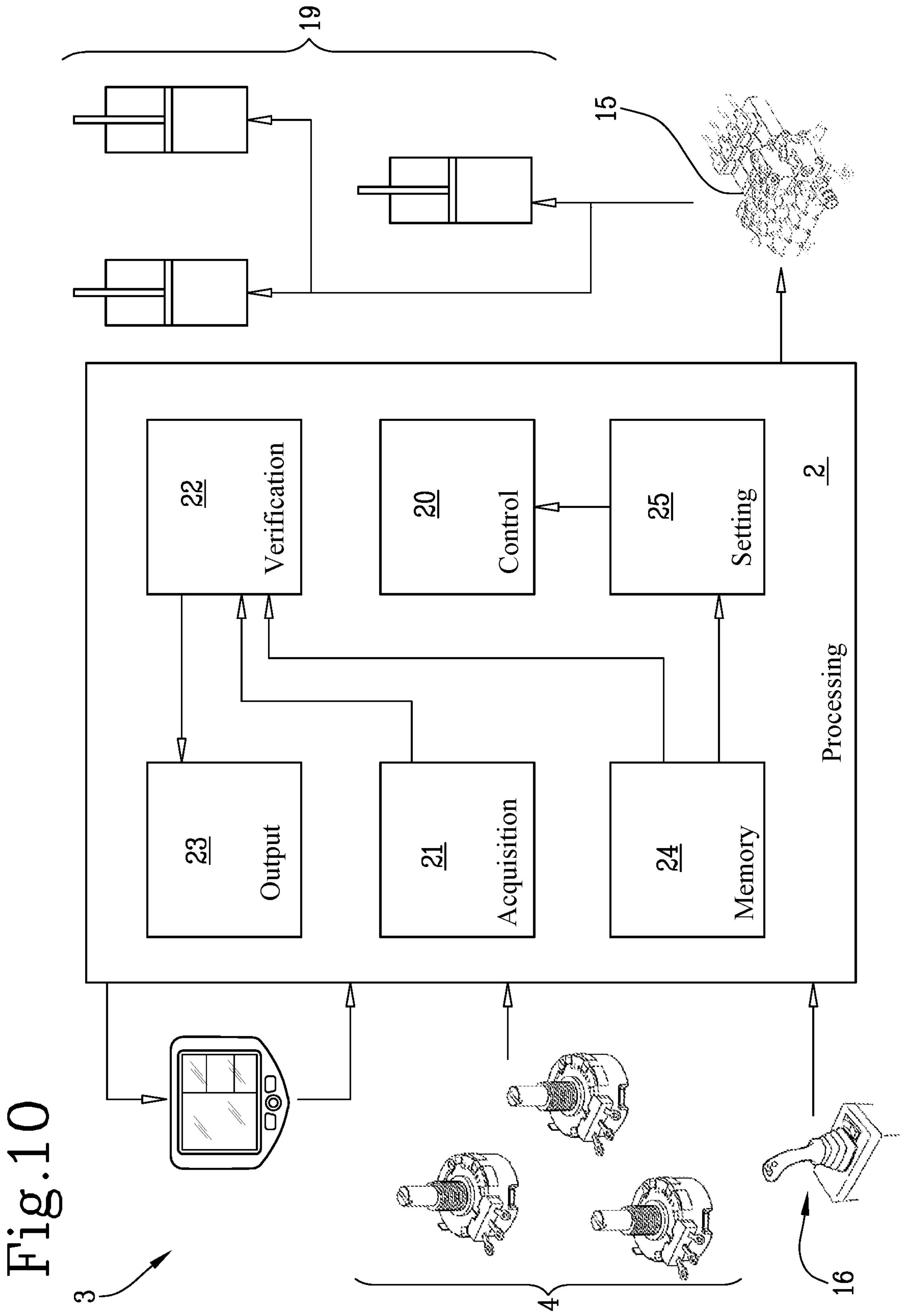
FIG. 10 is a schematic representation of the processing unit according to the invention.

In more general terms, the invention includes a plurality of operating apparatuses 12, 14, 17, 13, 180, 122 each which can be operated using one or more actuating devices (shown in a stylised form and labelled 19 in their entirety in FIG. 10; these operating apparatuses 12, 14, 17, 13, 180, 122 can be one or more of the following: operating arm 12, accessory 122, stabilizers 14, tower 17, flashing lights 180, road lights and others. The actuators 19 according to the invention can comprise all the above-mentioned hydraulic actuators and also switches (for lights and flashing warning lights 180); further, the actuator devices can include a speed limiting apparatus, which is designed to limit the maximum translation speed, to take into account the speed limits set for the telehandlers in the various countries.

The operating apparatuses 12, 14, 17, 13, 180, 122 may be, during use or when not operational, in a plurality of different operating conditions; for example, the operating arm 12 may be raised by 25° relative to the carriage 10 and extended by half its maximum length, or the accessory 122 may be at a quarter of the relative tilting stroke, the stabilizers 14 extended and lowered to raise the wheels 11, 13 and thereby stabilise the telehandler 1, or the flashing warning light 180 can be switched on or off, as well as the road lights and so on.

In the case of operating apparatuses 12, 14, 17, 13, 122 which are movable, the operating conditions constitute respective positions or spatial configurations of them, whilst in other cases, such as for the flashing warning lights 180 or lights, they are statuses in which they are switched, such as on or off, or switched on but in more than one operating mode, for example: side lights on or head lights or fog lights on and so on.

The set of operating conditions of the operating apparatuses 12, 14, 17, 13, 180, 122 at any time constitutes the alignment of the telehandler 1 at that time.

Reference will be made below to a particular (that is, desired) target alignment of the telehandler 1, which is the alignment of road travel, referred to in the introduction.

This road alignment, as already mentioned, varies in the specific operating conditions of the operating apparatuses 12, 14, 17, 13, 180, 122 as a function of the sector regulations imposed by the countries which regulate the road travel of the telehandlers 1 and, consequently, may vary also over time.

However, it should be noted that the invention may be designed for managing a different type of alignment or also a plurality of predetermined alignments; consider, for example, a possible preparation alignment for the repeatable work activities wherein, preliminarily, the arm 12, tower 17 and/or stabilizers 14 must be located in specific operating conditions in order to facilitate the work for the operators in the cab 18.

Generally speaking, it should be noted that, in this description, the processing unit 2 (and therefore the above-mentioned processing means) is presented as divided into separate functional modules solely for the purpose of describing the functions clearly and completely.

In practice, the processing unit 2 may consist of a single electronic device, also of the type commonly present on this type of machine, suitably programmed to perform the functions described; the various modules can correspond to hardware units and/or software routines forming part of the programmed device.

Alternatively or in addition, the functions can be performed by a plurality of electronic devices on which the above-mentioned functional modules can be distributed.

Generally speaking, the processing unit 2 may have one or more microprocessors or microcontrollers for execution of the instructions contained in the memory modules and the above-mentioned functional modules may also be distributed on a plurality of local or remote calculators based on the architecture of the network on which they are housed. According to an important aspect of the invention, the processing unit 2 includes an acquisition module 21 configured to receive one or more alignment parameters which represent, for each of the operating apparatuses 12, 14, 17, 13, 180, 122, a respective target operating condition; as mentioned above, the set of target conditions of the apparatuses identifies a target alignment, which may be the road travel alignment, to which reference is made below, by way of example, to describe a preferential embodiment of the invention.

More in detail, with regard to the stabilizers 14, their road circulation condition can be that wherein they are completely raised and completely retracted, to reduce to a minimum the overall dimensions of the lateral outline of the telehandler 1 and the dimensions between this and the ground; with regard to the tower 17, the road circulation condition may be that wherein it is oriented with the cab 18 in the direction of forward movement and with the arm 12 parallel to the longitudinal axis of the carriage 10; on the other hand, with regard to the operating arm 12, there may be several road circulation conditions, depending on whether it does not carry any accessory 122 or, if the accessory 122 is attached, depending on the type of accessory 122; this is described in more detail below.

The processing unit 2 may be connected to acquisition means 3 which include a user interface which allows the operator to enter or select the alignment parameters.

In detail, the interface 3 may be accessible from inside the driver's cab 18, for example, by means of a touchscreen display 3, acting on graphic indexes or by means of more traditional commands such as knobs, pushbuttons or levers.

The user interface 3 may also be configured to select the alignment between a plurality of alignments recorded in the memory module, using a menu of choice or the like and/or to allow the operator to set the desired alignments, specifying the target operating conditions corresponding to each operating apparatus which must be positioned or switched to obtain the desired alignment.

If the only alignment of interest is that of road travel, a single pushbutton or an index which can be activated of the touchscreen 3 may be sufficient.

The user interface 3 produces input signals which are sent to the processing unit 2 and convey the alignment parameters, on the basis of the user's selections or settings.

According to another important aspect of the invention, the telehandler 1 is equipped with detection means (schematically illustrated in FIG. 10 and labelled 4 in its entirety) for detecting the current operating conditions of the operating apparatuses 12, 14, 17, 13, 180, 122 and transmitting corresponding detection signals to said processing means 2; in practice, the detection means 4 include a plurality of sensors, associated with the various operating apparatuses 12, 14, 17, 13, 180, 122 which determine their current positions and statuses and which, together, detect the current telehandler 1 alignment, that is to say, the alignment which it has at a certain instant.

Moreover, the processing means include a control module 22 configured for determining, as a function of said measurement signals, whether the operating apparatuses 12, 14, 17, 13, 180, 122 are in the respective target operating conditions.

Advantageously, the invention allows the operator to easily adjust the alignment of the telehandler 1, without requiring the operator to descend from the cab 18 and make visual checks or measurements by hand; in detail, the telehandler 1 can be designed for guided and/or automatic adjustment of the alignment.

In effect, the processing unit 2 also includes an output module 23, functionally connected to the verification module 22, which is configured for transmitting status signals which are a function of the operating conditions of the operating apparatuses 12, 14, 17, 13, 180, 122 or at least of their target operating condition.

The user interface 3 is designed to receive these status signals and to visually or acoustically represent the condition in which the operating apparatuses 12, 14, 17, 13, 180, 122 have reached the road travel condition, or other target condition. Moreover, the user interface 3 may also be configured to represent in real time the current operating conditions, that is, currents or instantaneous operating conditions, of the operating apparatuses 12, 14, 17, 13, 180, 122 for the purpose, for example, of showing to the operator how a certain operating apparatus, at a given moment, is close to or far from the target condition. In order to do this, in addition to a possible modulation of acoustic signals, a graphical representation defined by scales or figures or indexes may be provided which by changing in shape and/or position and/or colour on a screen 3, with changes in the current condition of the apparatus monitored, gives the operator the idea of approaching or moving away from the target condition.

This aspect is important in the case of a guided adjustment of the alignment of the telehandler 1, which will be described in more detail below, during the description of the operation of the invention.

Further, the processing means 2 may comprise a memory module 24 in which are recorded the target operating conditions of the operating apparatuses 12, 14, 17, 13, 180, 122 corresponding to alignment parameter data which can be received by the acquisition module 21.

In this case, the verification module 22 is configured to compare the detection signals, which take into account the current operating condition of the operating apparatuses 12, 14, 17, 13, 180, 122, with the target operating conditions recorded in the memory module 24, to determine whether the operating apparatuses 12, 14, 17, 13, 180, 122 are in the respective target operating condition.

This aspect is described below for some examples of operating apparatuses 12, 14, 17, 13, 180, 122 relative to their road circulation condition, which do not constitute an exhaustive list of the apparatuses subject to alignment adjustment, for reasons already described in the discussion of the prior art. The first example relates to the telescopic operating arm 12 of the telehandler 1.

It should be noted that the operating arm 12 is designed to rotate upwards or downwards, relative to a horizontal axis, by means of a hydraulic cylinder and to extend and withdraw by means of one or more suitable hydraulic cylinders.

The detection means 4 include sensors, associated with the arm 12, which are designed to measure the angular position and the extension position of the arm 12.

These sensors may be an encoder or potentiometer connected to the arm 12 and to the carriage 10 for measuring the relative angle and an encoder connected to a reel on which a wire is wound having an end fixed to the distal portion of the arm 12, to measure the length; other solutions are possible, provided they are suitable for the purpose, such as position sensors inside cylinders which measure the position of the rod.

Whatever the case, with regard to the arm 12, several road circulation conditions of the arm 12 are recorded in the above-mentioned memory module 24 associated with various accessories 122 which can be carried by the arm 12 or in their absence, in which, preferably, the arm 12 is fully retracted and has a respective and specific minimum angular position, which is therefore not fixed but variable.

More generally speaking, in the operating condition of circulation the arm is positioned at a position of minimum extension, which in some cases may not be the completely retracted position.

In effect, on the one hand, the sector regulations may comprise a maximum front arm extension, that is to say, a maximum extension of the arm, relative to the position of the head of the operator, and on the other hand, in the absence of an accessory, it may be useful to compensate with the extension of the arm for a barycentre of the machine moved too much towards the rear.

In other words, as already explained above, on the basis of the accessory 122 which is carried by the arm 12, the condition of road circulation of the operating arm 12 varies. In effect, even assuming that the regulations provide for the same minimum height above the ground of the accessory 122, for the purpose of the circulation allowed, since the accessories have different vertical dimensions, the angular position which the arm 12 must adopt so that it has permission to circulate, varies accordingly; obviously, this aspect is even more the case if the sector regulations of one or more countries require different minimum heights from the ground for various accessories 122 mounted on the arm 12.

There is also a special situation in which the arm 12 is without an accessory 122; in this case, it can be established, for example, that the circulation condition is the one with zero angular position, that is to say, with the arm 12 substantially in contact with the carriage 10; more generally speaking, this position corresponds to that in which the hydraulic lifting cylinder is at the end of the stroke in its fully retracted configuration.

The alignment parameter relating to the type of accessory 122 may be entered or selected by the operator using the user interface 3, or it may automatically be acquired using devices included in the above-mentioned acquisition means 3, such as an RFID reader mounted on the rapid coupling which reads the identification information contained in the various transponders or "labels" applied to the various accessories or by reading two- or one-dimensional bar codes and so on; this identification information is associated with the respective accessories in the memory module 24 of the processing unit 2.

As mentioned above, amongst the operating apparatuses for which the operating condition may have to be adjusted for the purpose of road travel, there is also the accessory 121, which is moved by a hydraulic tilting cylinder. Depending on the accessory 121 mounted, the regulations of the country may request that the accessory be kept parallel to the ground or inclined upwards, on the basis of the configuration and the dimensions. In this case, the detection means 4 according to the invention include a sensor designed to detect the orientation, for example the tilting angle relative to the horizon; for example, it is possible to fit a potentiometer to measure the angle, an inertial sensor or an electronic level.

In this case, preferably, the memory module 24 records an operating condition of road circulation for each accessory wherein this is in a specific tilting position.

If, for example, the telehandler 1 is equipped with scissor-type stabilizers 14, the carriage 10 has both at the front and the rear, a pair of telescopic stabilizing arms designed to rotate downwards or upwards and designed to extend and withdraw by means of respective hydraulic cylinders.

The detection means 4 according to the invention include in this case sensors associated with the stabilizers 14, which are designed to measure the angular position and the extension position of each stabilising arm. The sensors associated with the stabilizers 14 can, for example, be like those of the operating arm 12, that is, encoders, potentiometers or position sensors applied in various ways.

In this case, preferably, the memory module 24 records an operating condition of road circulation wherein all the stabilizing arms are in a completely raised and fully retracted position.

In the case of a rotary telehandler 1, the invention comprises the above-mentioned tower 17 which is mounted rotatably, about a vertical axis, on the carriage 10.

In this case, the detection means 4 include a sensor designed to detect the relative angular position of the tower 17 in the memory module 24 preferably recorded the operating condition of road circulation wherein the tower 17 is aligned with the axis of the carriage 10; in detail, in this operating condition, the cab 18 is facing in front of the direction of travel and the arm 12 is parallel to the longitudinal axis of extension of the carriage 10.

Moreover, the telehandlers 1 typically have four steering wheels 11, 13, that is to say, a pair of front wheels 11 and a pair of two rear wheels 13 designed to steer by means of respective actuating devices 19, for example of the hydraulic type.

In this case, the detection means 4 may comprise one or more sensors designed to detect the steering position of the pair of rear wheels 13 and, in the memory module 24, the operating condition of road circulation in which the pair of rear wheels 13 are in the relative straight position, parallel to an axis of the carriage 10, is preferably recorded. In order to maintain this condition of circulation for the rear wheels 13 means are provided for locking or unlocking the steering device or devices of the rear wheels 13. With regard to operating apparatuses which do not move but have several operating states, such as the flashing warning lights 180, side lights or locks, the detection means 4 can include current measuring devices or devices for measuring other electrical quantities and position sensors associated with the bolts of the locks. In this case, the memory module 24 will preferably have registered a circulation condition corresponding to the "access" state or to the "closed" state, depending on circumstances.

A possible operation of the invention is now described, in the version with a guided adjustment of the alignment of road travel, with the aid of FIGS. 3-10.

When the operator needs to prepare the alignment of the telehandler 1 according to the invention for road travel, the operator does not need to be provided with measuring devices or even get down from the cab 18. The operator will use the specific guided adjustment function which is made accessible through the user interface 3.

For example, it will be assumed for simplicity that the processing unit 2 has automatically recognised that the arm 12 mounts forks 122 as an accessory. On the basis of the rules of the sector in the country in which the telehandler 1 must circulate and on the basis of the current alignment of the telehandler 1, determined by the detection means 4 described above, the screen of the interface 3 will present to the operator a list of the activities to perform. The screen may provide a menu in advance from which to select the country in which to operate or this is determined automatically by geolocation.

If the telehandler 1 is in the alignments shown in FIG. 2, 3, 6 or 7, the list of activities to perform will already be complete, that is to say, all the steps to be executed will be "ticked off" or characterised by a green light or other graphic indices which represent the condition of verified alignment for road circulation.

Figure 2:
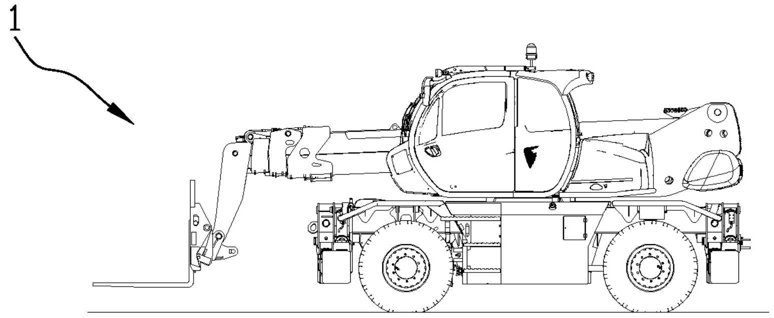
FIGS. 2 and 3 are, respectively, a side view and a top view of the telehandler of FIG. 1, in an alignment suitable for road travel.
Figure 3:
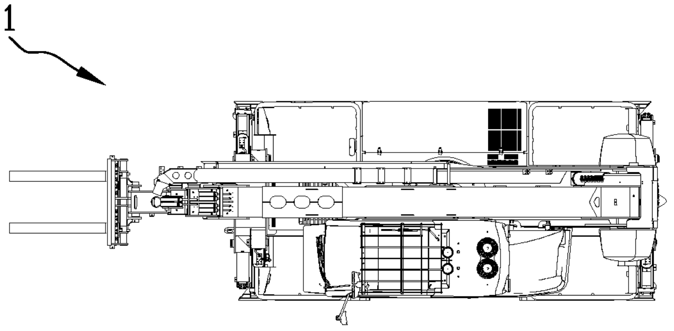
Figure 6:
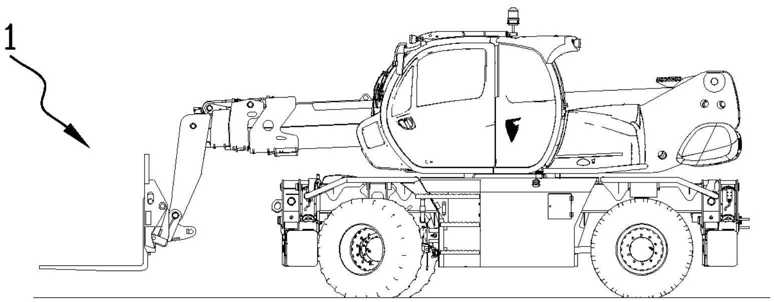
FIGS. 6 and 7 are, respectively, a side view and a top view of the telehandler of FIG. 1, in an alignment suitable for road travel.
Figure 7:
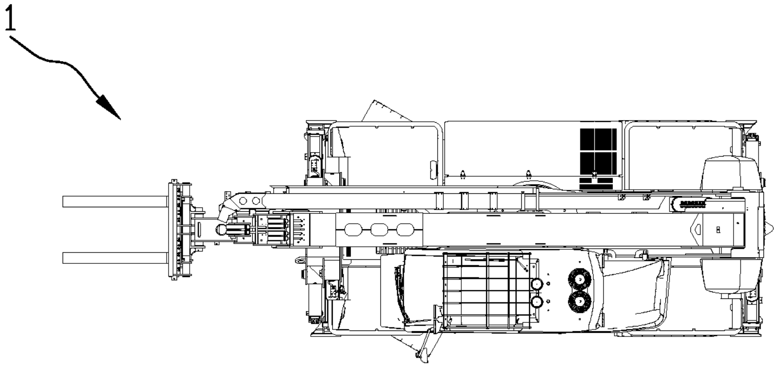

In effect, in FIGS. 2 and 3, the telehandler 1 has the retracted arm 12 lowered to the minimum allowed for the forks 122, the stabilizers 14 raised and closed, the tower 17 aligned with the carriage 10 and all the wheels 11, 13 straight; FIGS. 6 and 7 on the other hand show that the front wheels 11 are steering wheels, which is fully compatible with circulation on the road. If, on the other hand, one or more operating apparatuses 12, 14, 17, 13, 180, 122 are not in the road circulation condition, the operator must change them by actuating the commands 16 in the cab 18, following the list and the guide which the processing unit 2 provides through the interface 3. For example, if the arm 12 is not in the circulation condition and is, on the other hand, extended and raised as in FIG. 5, the operator must operate the joystick 16 or other command, in order to lower and shorten the arm 12 until the interface 3 signals it that it has reached the condition suitable for driving. Optionally, as already explained above, the screen of the interface 3 can graphically show the degree of vicinity of the arm 12 to its condition which is suitable for circulation on the road, so as to also facilitate the task for the operator.

Figure 4:
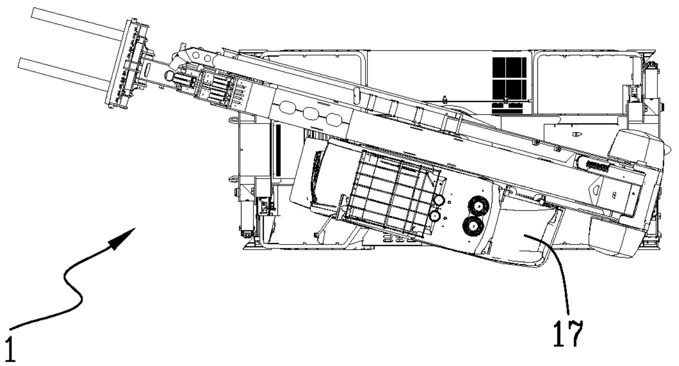
FIG. 4 is a top view of the telehandler of the preceding drawings, in an alignment which is not suitable for road travel.
Figure 5:
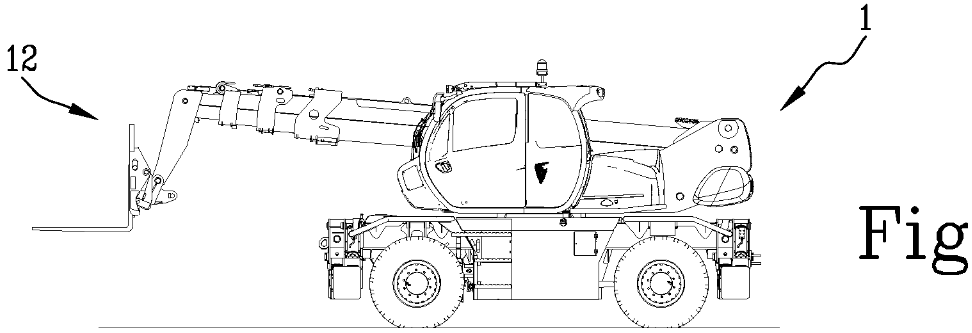
FIGS. 5, 8 and 9 are side views of the telehandler, in alignments which are unsuitable for road travel.

If the tower 17 is rotated obliquely, as in FIG. 4, this will be signalled by the interface 3 and the operator must, before moving forward along the road, rotate the tower 17 until aligning it as shown in the other drawings, that is to say, until receiving the signal that its operating arrangement is correct.

Figure 8:
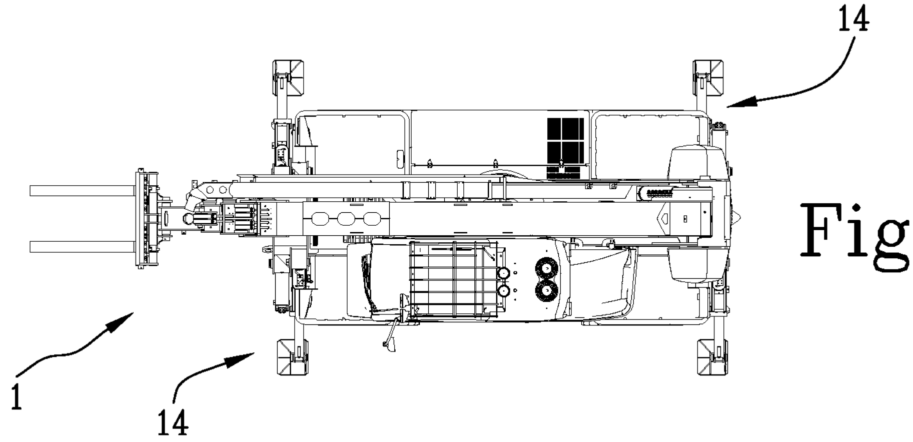

If the stabilizers 14 are extended as shown in FIG. 8, the operator will return them completely until the interface 3 indicates that they are in the correct operating condition.

Figure 9:
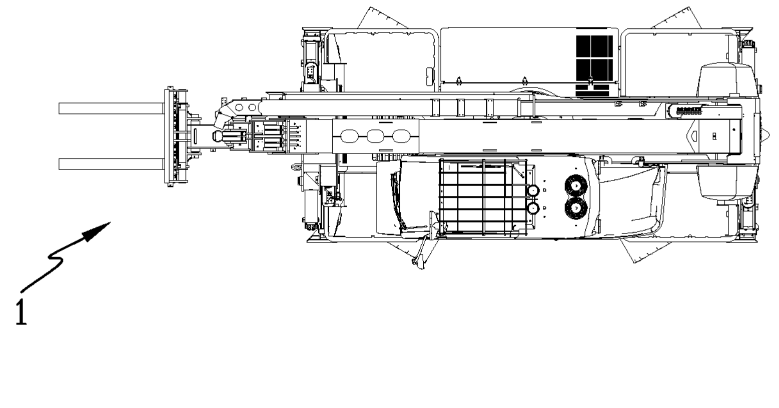

In the same way, since it is dangerous to travel on the road with the steering of the rear wheels 13 not locked, if the telehandler 1 has the alignment of FIG. 9, then the interface 3 will request the operator to straighten first the rear wheels 13 and then lock the rear steering.

If there were no system for automatic recognition of the accessory 122, the interface may, for example, comprise a menu from which to select the accessory 122 mounted, before performing the operations listed above.

When all the points on the list of activities to be performed have been dealt with and the user interface 3 no longer signals activities to be performed, then the telehandler 1 is in an alignment suitable for road circulation and the operator can start the journey in the knowledge of being in compliance with the national regulations, having completed the activities in a small fraction of the time required using the prior art solutions and without the relative inconvenience.

As mentioned above, the invention may also have a version with an automatic adjustment of the alignment, which is not necessarily alternative to that with guided adjustment.

In this case, the processing unit 2 comprises an automatic setting module 25 which, upon the consent of the operator, determines the production by the control module 20 of control signals designed to automatically move the operating apparatuses 12, 14, 17, 13, 180, 122 to the respective target operating condition.

In other words, the interface signals to the operator that the alignment of the telehandler 1 is not suitable for road circulation in the country in which it is located and therefore the operator authorises the processing unit 2 to correct by suitably intervening on the operating apparatuses 12, 14, 17, 13, 180, 122 which are not in the correct operating condition.

After that, the operator only has to travel on the road with the telehandler 1 according to the invention.

The invention claimed is:

1. A telehandler (1) comprising a plurality of operating apparatuses (12, 14, 17, 13, 180, 122), including a telescopic operating arm and stabilizers, each operated by one or more actuator devices (19) and electronic processing means (2) which include an acquisition module (21) configured to receive one or more alignment parameters which represent, for each of said operating apparatuses (12, 14, 17, 13, 180, 122), a respective target operating condition;

wherein the telehandler (1) also includes detection means (4) configured to detect current operating conditions of the operating apparatuses (12, 14, 17, 13, 180, 122) and configured to transmit corresponding detection signals to said processing means (2), the processing means also including a verification module (22) configured to determine, as a function of said detection signals, whether the operating apparatuses (12, 14, 17, 13, 180, 122) are in the respective target operating conditions.

2. The telehandler (1) according to claim 1, wherein the processing means (2) include an output module (23) configured for transmitting status signals as a function of at least one operating condition of the operating apparatuses (12, 14, 17, 13, 180, 122).

3. The telehandler (1) according to claim 1, comprising a user interface (3) connected to said processing means (2).

4. The telehandler (1) according to claim 2, wherein the said interface (3) is configured to receive said status signals and is configured to communicate to an operator when one or more operating apparatuses (12, 14, 17, 13, 180, 122) are in their target operating condition.

5. The telehandler (1) according to claim 4, comprising acquisition means (3) connected to the processing means and configured to allow the operator to set up or select the alignment parameters.

6. The telehandler (1) according to claim 4, comprising acquisition means (3) connected to the processing means and configured to allow the operator to set up or select the alignment parameters; wherein the acquisition means comprise said user interface (3).

7. The telehandler (1) according to claim 1, wherein the processing means comprise at least one memory module (r24) configured to record target operating conditions of the operating apparatuses (12, 14, 17, 13, 180, 122) corresponding to alignment parameters which can be received from the acquisition module (21), the verification module (22) being configured for comparing the detection signals with the target operating conditions recorded in said memory module (24), to determine whether one or more operating apparatuses (12, 14, 17, 13, 180, 122) are in the respective target operating condition.

8. The telehandler (1) according to claim 7, comprising a telescopic operating arm (12) configured to move an accessory (122) configured to grip a load and configured to rotate upwards or downwards by an actuator device and extend and retract by one or more different actuator devices (19), wherein the detection means (4) comprise sensors associated with the arm (12) and configured to detect an angular position and the extension position of the arm (12), wherein the memory module (24) is configured to record at least one operating condition of road travel when the arm (12) is in a position of minimum extension and in a minimum angular position.

9. The telehandler (1) according to claim 8, wherein the memory module (24) is configured to record several operating conditions of road travel of the arm (12) associated with various accessories configured to be carried by the arm (12) or in their absence, in which the arm (12) has a respective and specific minimum angular position.

10. The telehandler (1) according to claim 8, comprising front and rear scissor stabilizers (14), each equipped with a pair of telescopic stabilizing arms configured to rotate upwards or downwards and configured to extend and retract by means of relative actuator devices (19), wherein the detection means (4) comprise sensors associated with the stabilizers (14) and configured to detect the angular position and the extension position of each stabilizing arm (12), wherein the memory module (24) is configured to record at least one operating condition of road travel when all the stabilizing arms are in a completely raised and completely retracted position.

11. The telehandler (1) according to claim 8, comprising a carriage (10) movable on wheels, on which is rotatably mounted a tower (17) which has a cab (18) and an operating arm (12), by a relative actuator device (19), wherein the detection means (4) comprise at least one sensor configured to detect the angular position of the tower (17), wherein the memory module (24) is configured to record an operating condition of road travel when the tower (17) is aligned with an axis of the carriage (10).

12. The telehandler (1) according to claim 8, comprising a carriage (10) movable on a pair of front wheels (11) and on a pair of two rear wheels (13) configured to steer by means of respective actuators, wherein the detection means (4) comprise at least one sensor configured to detect the steering position of said pair of rear wheels (13), wherein the memory module (24) is configured to record an operating condition of road travel when the pair of rear wheels (13) are in a straight position parallel to an axis of the carriage (10).

13. The telehandler (1) according to claim 1, comprising commands (16) configured to be operated by an operator, wherein the processing means (2) include a control module (20) configured for producing control signals configured to adjust the operation of the actuators, on the basis of the actuation of said commands (16), wherein the processing means (2) comprise an automatic setting module (25) which determines the production by the control module (20) of control signals configured to automatically move the operating apparatuses to the respective target operating condition.

* * * * *